US012306033B2

(12) United States Patent
Ttraverso et al.

(10) Patent No.: US 12,306,033 B2
(45) Date of Patent: May 20, 2025

(54) SYSTEMS AND METHODS FOR DERIVING WEIGHT AND QUANTITY BASED ON ACTIVATIONS OF ROBOT ACTUATORS USED FOR OBJECT RETRIEVAL

(71) Applicant: inVia Robotics, Inc., Westlake Village, CA (US)

(72) Inventors: Joseph Ttraverso, Simi Valley, CA (US); James Anderson, Oak Park, CA (US); Lior Elazary, Agoura Hills, CA (US); Randolph Charles Voorhies, Newbury Park, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 658 days.

(21) Appl. No.: 17/721,622

(22) Filed: Apr. 15, 2022

(65) Prior Publication Data
US 2023/0332941 A1    Oct. 19, 2023

(51) Int. Cl.
| | | |
|---|---|---|
| *G06F 7/00* | (2006.01) | |
| *B25J 15/06* | (2006.01) | |
| *B25J 19/02* | (2006.01) | |
| *B65G 1/137* | (2006.01) | |
| *G01G 19/52* | (2006.01) | |

(52) U.S. Cl.
CPC .......... *G01G 19/52* (2013.01); *B25J 15/0616* (2013.01); *B25J 19/02* (2013.01); *B65G 1/137* (2013.01)

(58) Field of Classification Search
CPC ..... G01G 19/52; G01G 19/00; B25J 15/0616; B25J 19/02; B25J 15/00; B25J 19/00; B65G 1/137; B65G 1/04; B65G 1/1371; B65G 1/00

USPC .................................................. 700/213, 218
See application file for complete search history.

(56) References Cited

U.S. PATENT DOCUMENTS

| | | | |
|---|---|---|---|
| 9,272,417 B2 * | 3/2016 | Konolige | ............. B25J 15/0616 |
| 2016/0184992 A1 * | 6/2016 | Naderer | ................. B25J 9/1687 |
| | | | 700/218 |
| 2024/0217104 A1 * | 7/2024 | Neville | ................. B25J 15/0616 |
| 2024/0217796 A1 * | 7/2024 | Petrie, Jr. | ............. G01G 19/083 |

FOREIGN PATENT DOCUMENTS

WO    WO-2022203980 A1 *    9/2022    ............. B25J 19/02

* cited by examiner

*Primary Examiner* — Yolanda R Cumbess
(74) *Attorney, Agent, or Firm* — Ansari Katiraei LLP; Arman Katiraei; Sadiq Ansari

(57) ABSTRACT

Disclosed are systems and methods for computing an object's weight or the quantity of items within the object based on activations of different robot actuators used in retrieving the object from a storage location. Specifically, the robot may activate one or more actuators during retrieval of an object, may obtain a measurement in response to activating a particular actuator, and may derive a weight of the object based on the measurement by converting the measurement from a first range of values that are associated with activations of the particular actuator to a second range of values that are disassociated with activations of the particular actuator. The robot may then modify its operation in response to the weight that is derived for the object matching or being mismatched to an expected or last tracked weight.

20 Claims, 11 Drawing Sheets

SYSTEMS AND METHODS FOR DERIVING WEIGHT AND QUANTITY BASED ON ACTIVATIONS OF ROBOT ACTUATORS USED FOR OBJECT RETRIEVAL

BACKGROUND

An object's weight may be used to determine if a correct object has been retrieved from storage, or if the retrieved object contains a last tracked quantity of items. However, not all robots have a scale or weight sensor, and therefore do not have the ability to directly measure the retrieved object's weight.

DETAILED DESCRIPTION OF PREFERRED EMBODIMENTS

Figure 1:
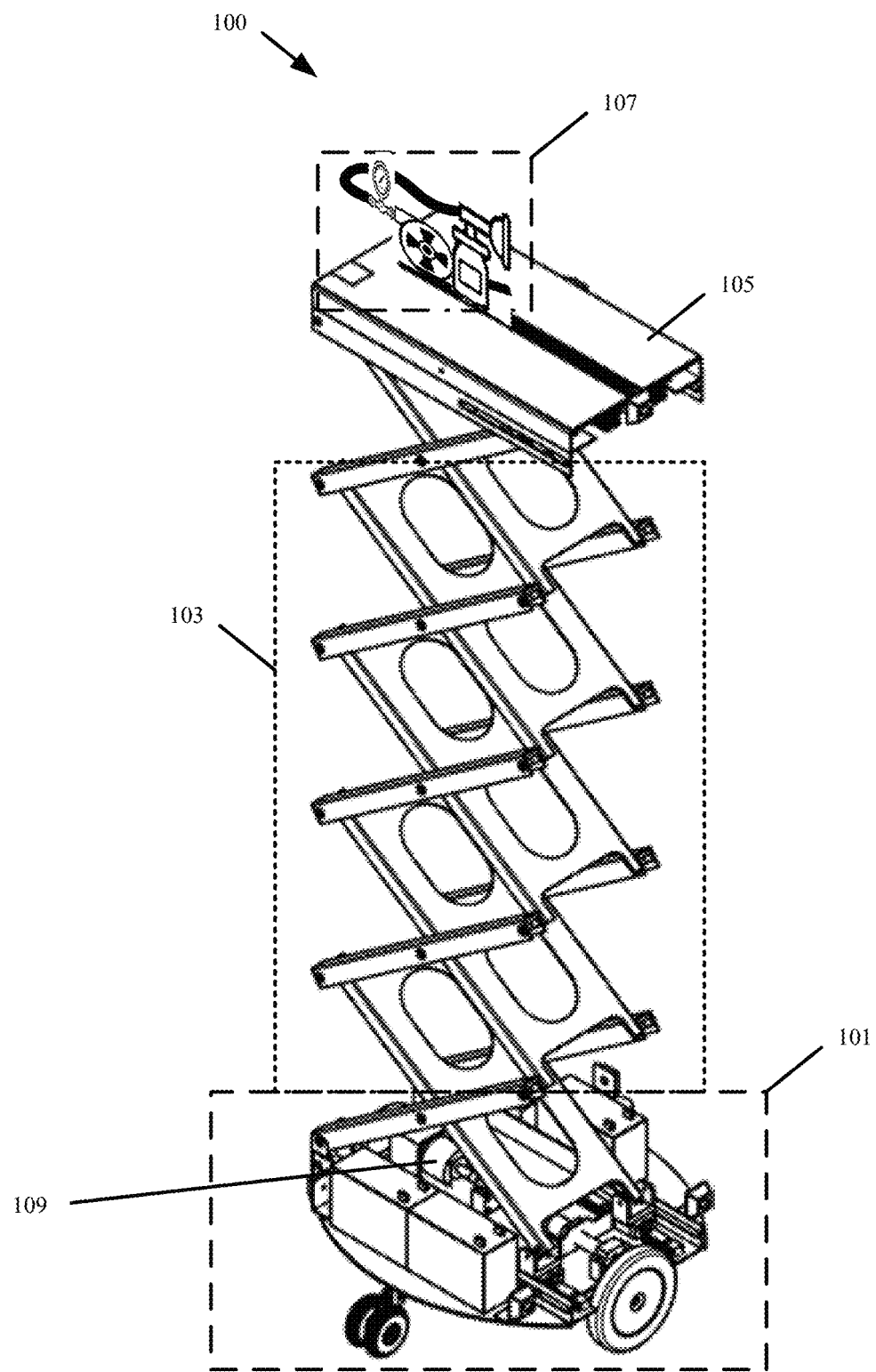
FIG. 1 illustrates an example robot with various actuators and/or associated sensors for determining object weight and quantity based on pressure, displacement, force, and/or other measurements resulting from the actuator activations in accordance with some embodiments presented herein.

The following detailed description refers to the accompanying drawings. The same reference numbers in different drawings may identify the same or similar elements.

Disclosed are systems and methods for computing an object's weight or the quantity of items within the object based on activations of different robot actuators used in retrieving the object from a storage location. The robot actuators do not output a direct measure of weight. Instead, the robot actuators activations may produce or result in measures of pressure, displacement, and force from which the weight or quantity values may be derived using artificial intelligence and/or machine learning ("AI/ML") techniques. Accordingly, the systems and methods allow robots without a scale or weight sensors to nevertheless obtain a weight or quantity measurement for an object based on measurements from actuators and/or associated sensors that the robots use for other purposes besides weight measurements (e.g., object retrieval, transfer, retention, etc.).

In some embodiments, the systems and methods may include deriving the weight and/or quantity of items contained in an object based on measurements from a vacuum that the robot uses to engage, retrieve, place, or otherwise interact with the object. In some such embodiments, the amount of suction or vacuum pressure generated during an activation of the vacuum to securely engage the object may be converted or mapped to a weight or quantity measure for the object.

In some embodiments, the systems and methods may include deriving the weight and/or quantity of items contained in an object based on a carriage pull force that is generated by the drive motors of the robot. In some such embodiments, the instantaneous velocity or torque generated during an activation of the drive motors to move the robot with the object a certain distance may be converted or mapped to a weight or quantity measure for the object.

In some embodiments, the systems and methods may include deriving the weight and/or quantity of items contained in an object based on displacement to a lift of the robot that is used to retain or carry the object after retrieval. In some such embodiments, the weight of the object may cause a proportionate amount of displacement to the lift height, or may require additional lift activations to restore the lift to a set height. Accordingly, the amount of displacement or the force associated with the additional lift activations may be converted or mapped to the object weight or the quantity of items within the object.

In some embodiments, the systems and methods may include deriving the weight and/or quantity of items contained in an object based on vertical displacement to a retrieval element of the robot used in retrieving the object from a storage location. Transitioning the object from the storage location onto a lower platform of the robot may create a downward force on the retrieval element. The downward force may produce a proportionate amount of vertical displacement on the retrieval element that may be measured and converted or mapped to a weight or quantity measure for the object.

Various artificial intelligence and/or machine learning ("AI/ML") techniques may be used to model the conversion or mapping of the different actuator activations or the results of the activations to weight measurements. The AI/ML techniques may bias the models to account for different environmental variables, such as the object material or material of the surface on which the object rests, that may affect the conversions or mappings. In some embodiments, the AI/ML techniques may use measurements from two or more different actuators and/or associated sensors to verify the accuracy of the models and/or the conversion of each actuator or sensor measurement (e.g., vacuum pressure, carriage pull force, displacement, etc.) to a weight measurement.

FIG. 1 illustrates an example robot 100 with various actuators and/or associated sensors for determining object weight and quantity based on pressure, displacement, force, and/or other measurements resulting from the actuator activations in accordance with some embodiments presented herein. Robot 100 may include motorized base 101, lift 103, platform 105, and retrieval element 107.

Figure 2:
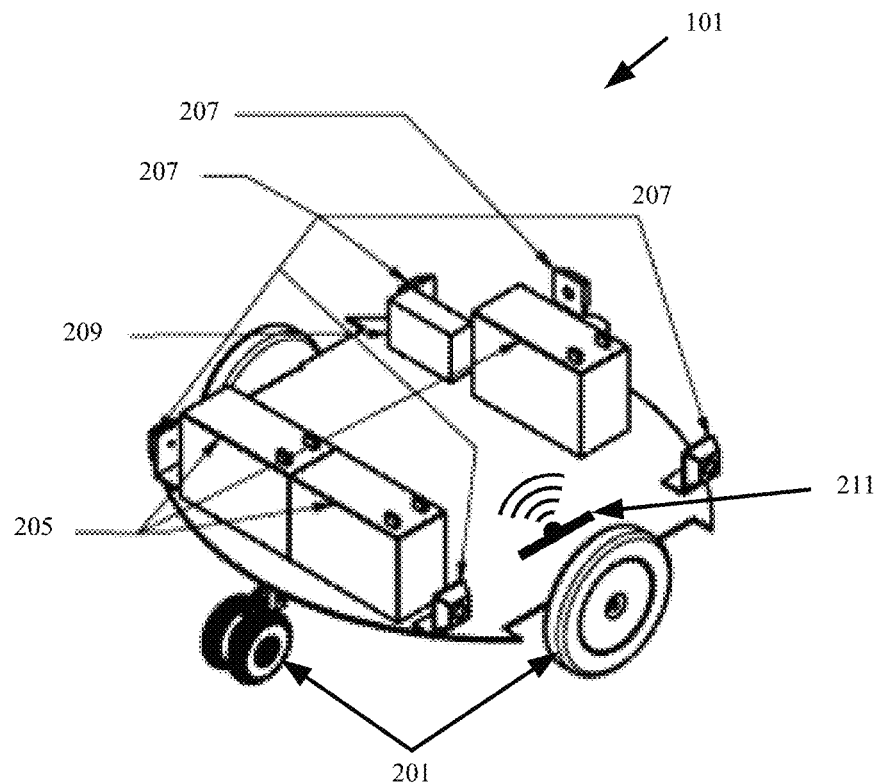
FIG. 2 illustrates top and bottom views for the motorized base of the robot in accordance with some embodiments presented herein.
Figure 2:
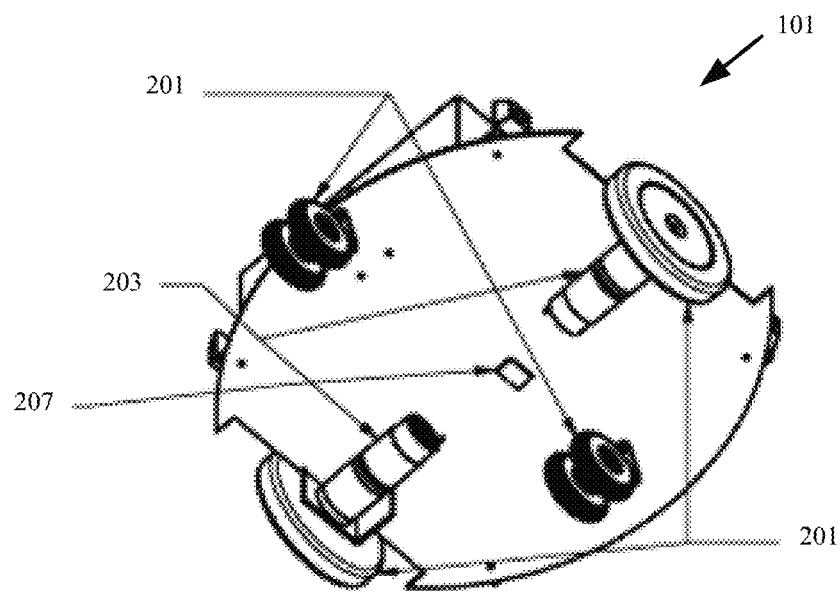

FIG. 2 illustrates top and bottom views for motorized base 101 of robot 100 in accordance with some embodiments presented herein. Motorized base 101 may include wheels 201, one or more drive motors 203, and power supply 205. Power supply 205 may be a battery or other energy storage apparatus that supplies power to drive motors 203 and/or other electronic or powered components of robot 100. Drive motors 203 may power wheels 201, and move robot 100 about a first plane that may be defined using x and y coordinates. Drive motors 203 may produce a controllable amount of instantaneous velocity or torque in response to inputs provided by a processor or controller of the robot or by a remote operator. In other words, activations of drive motors 203 may generate or result in measurable quantities of instantaneous velocity, torque, power, and/or other forces.

In some embodiments, motorized base 101 may house additional components of robot 100. For instance, motorized base 101 may include one or more sensor 207 that aid in navigation and obstacle avoidance and/or in measuring the performance of drive motors 203. Sensors 207 may measure and/or output the applied or generated instantaneous velocity or torque by drive motors 203. In some embodiments, sensors 207 may be directly integrated as part of drive motors 203, and may directly output the applied or generated instantaneous velocity or torque to the other components of robot 100 or the remote operator. Sensors 207 may include cameras, accelerometers, speedometers, velocity sensors, torque transducer, depth and/or three-dimensional sensors, light detection and ranging ("LiDAR"), radio detecting and ranging ("RADAR"), tilt sensor, inertial sensor, thermometer, odometer, wheel encoders, and/or other devices that measures a physical property with which robot 100 regulates speed, direction, turning, and/or other movements of motorized base 101.

Motorized base 101 may also house one or more processors 209 that control operations of robot 100 by controlling activations of drive motors 203, lift 103, retrieval element 107 and/or other actuators of robot 100. Processors 209 may collect sensory data from one or more sensors 207 in motorized base 101, elsewhere on robot 100, and/or remote sensors (e.g., positional beacons in a site) in order to control the activations of various actuators of robot 100 used in detecting, retrieving, and/or placing objects in a site. Processors 209 may also be used to derive an object's weight or quantity based on pressure, displacement, force, and/or other measurements obtained from the various actuators and/or associated sensors of robot 100 (e.g., drive motors 203, sensors 207, lift 103, retrieval element 107, etc.).

In some embodiments, motorized base 101 may include one or more radios 211 for wireless communications with other robots, a controller, and/or other network-enabled devices. Robot 100 may receive instructions for retrieving an object from a particular location as well as last measured weights or quantities associated with the item. Radios 211 may also be used to provide the actuator outputs, sensors outputs, and/or derived weight and/or quantity measurements to the controller or another device for inventory management or robot coordination.

In some embodiments, motorized base 101 may include other means of locomotion besides or in addition to aforementioned wheels 201. For instance, motorized base 101 may include tracks, two or more articulating legs, propellers, and/or other mechanical forms of locomotion for moving about a ground surface.

Figure 3:
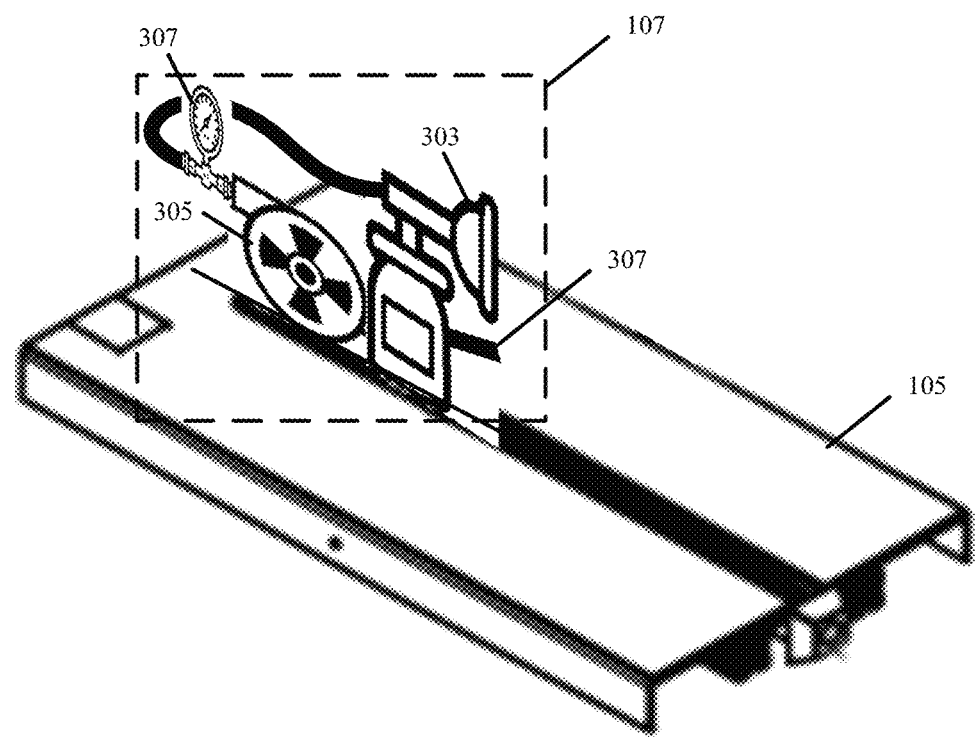
FIG. 3 illustrates a top perspective view and a bottom perspective view of the platform, retrieval element, and associated sensors in accordance with some embodiments presented herein.
Figure 3:
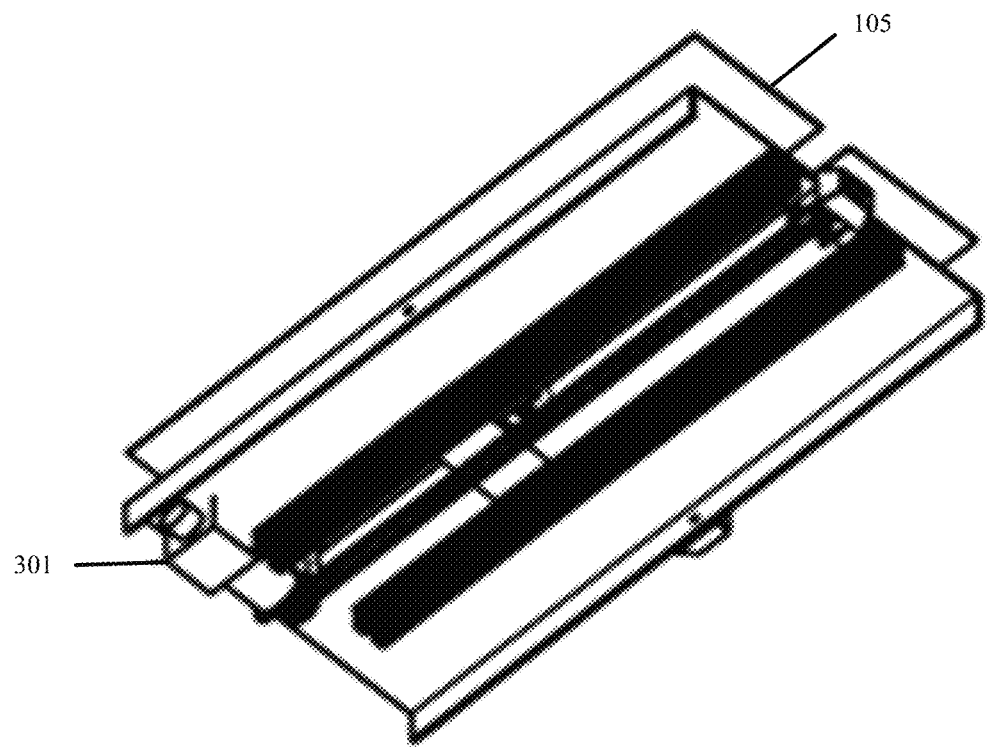

Although not shown in FIG. 3, lift 103 may be attached about centrally and atop motorized base 101. Lift 103 may be bolted on or otherwise affixed to motorized base 101. Lift 103 may be an extensible and/or collapsible structure that raises or lowers to a plurality of different heights. Lift 103 may include metal, plastic, and/or other rigid elements that are arranged in a collapsible manner, and that support raising and lowering lift 103 with heavy objects (e.g., objects weighing under one hundred pounds). As shown in FIG. 1, lift 103 may be a scissor lift with an extensible, collapsible, and/or folding framework. In some other embodiments, lift 103 may be a vertical rail-based structure, spiral structure, or other extensible structure. In some embodiments, lift 103 may extend to a height of ten feet above motorized base 101. In some other embodiments, lift 103 may be configured to reach greater heights if necessary.

Lift 103 may raise or lower to any of the plurality of different heights using one or more lift motors 109 that are located on motorized base 101 or connected to a base of lift 103. In some embodiments, lift motors 109 may raise or lower lift 103 using a pneumatic force, piston, drive chain, rotating motor and/or gear, screw-based mechanism, piston, and/or other mechanical element. Accordingly, activations of lift 103 may include measures of an applied force and/or power to elevate lift 103 to a desired height.

Lift 103 may include associated sensors for measuring the force, power, and/or other output for raising and lowering platform 105 atop lift 103 to different heights, and/or sensors for measuring the height of platform 105. For instance, lift 103 may include a draw wire gauge, laser rangefinder, linear optical encoder, linear magnetic encoder, camera, linear position sensor, and/or other distance sensor to measure the height or distance of platform 105 from the ground or from motorized base 101. Lift motors 109 and/or the associated sensors may provide the lift force and/or height measurements to processor 209, and processor 209 may derive the object weight and/or quantity based on the measurements obtained from lift motors 109 and/or the associated sensors.

Platform 105 may be attached atop lift 103, and may include a flat surface for retaining objects that are retrieved by retrieval element 107. Platform 105 may also include retrieval element 107 and one or more associated sensors for monitoring, controlling, or measuring operation of retrieval element 107.

FIG. 3 illustrates a top perspective view and a bottom perspective view of platform 105 with retrieval element 107 and the associated sensors in accordance with some embodiments presented herein. As shown in FIG. 3, retrieval element 107 may include motor 301 that is connected to and moves suction assembly 303, vacuum pump 305, and one or more sensors 307.

Robot 100 may activate motor 301 to extend retrieval element 107 across platform 105 towards a target object until contact is made. Contact may be detected by one or more sensors 307. For instance, a sensor may detect when motor 301 receives resistance and/or when suction assembly 303 is displaced in response to contacting the target object.

In some embodiments, retrieval element 107 may sit atop a track with movement of retrieval element 107 along the track being controlled by motor 301. In some other embodiments, motor 301 may be a pneumatic cylinder that is coupled at one end to retrieval element 107. Motor 301 may extend or retract the pneumatic cylinder, thereby moving retrieval element 107 about platform 105.

In some embodiments, suction assembly 303 may be comprised of a suction cup. When the suction cup is pressed against an object, it may adhere to that object with suction. Vacuum pump 305 may be activated to remove air from between the suction cup and the object, and to create a vacuum to provide better suction for the suction cup to adhere to the target item (e.g., increase the suction force between the two). In some embodiments, one or more sensors 307 of retrieval element 107 may measure the amount of suction between suction assembly 303 and the engaged object and/or the vacuum pressure required to generate a specified amount of suction.

Once suction assembly 303 engages the object with a desired amount of suction, pressure, and/or force, motor 301 may reverse and begin retracting suction assembly 303 along with the engaged object so that the object fully rests atop platform 105. In some embodiments, vacuum pump 305 may stop the vacuum and optionally apply positive pressure, thereby causing the object to disengage from suction assembly 303. Alternatively, motor 301 may produce a movement (e.g., rapid back and forth movements) to disengage suction assembly 303 from the object.

In some embodiments, retrieval element 107 may include one or more springs that connect suction assembly 303 to a pole or bracket that elevates suction assembly 303 over platform 105. The springs may allow suction assembly 303 to displace vertically. Specifically, suction assembly 303 may engage the object when it is at a storage location that is higher than platform 105. Upon retrieving the object onto platform 105, the weight of the object may cause vertical displacement of suction assembly 303. The vertical displacement may be based on the spring force holding suction assembly 303 upright and vertical relative to the counterforce from the weight of the object pulling suction assembly 303 downwards towards platform 105. Sensors 307 may measure the amount of vertical displacement, and processor 209 may convert or map the vertical displacement measurement to a measure of weight or quantity.

In some embodiments, retrieval element 107 may include a strain gauge or other sensor behind suction assembly 303 for measuring the force that is required to retrieve or pull the object engaged by suction assembly 303. In addition to measuring the pull force exerted by motor 301, the strain gauge may also be used to measure the carriage pull force required to move the object when the object remains at a storage location and/or off robot 100.

Figure 4:
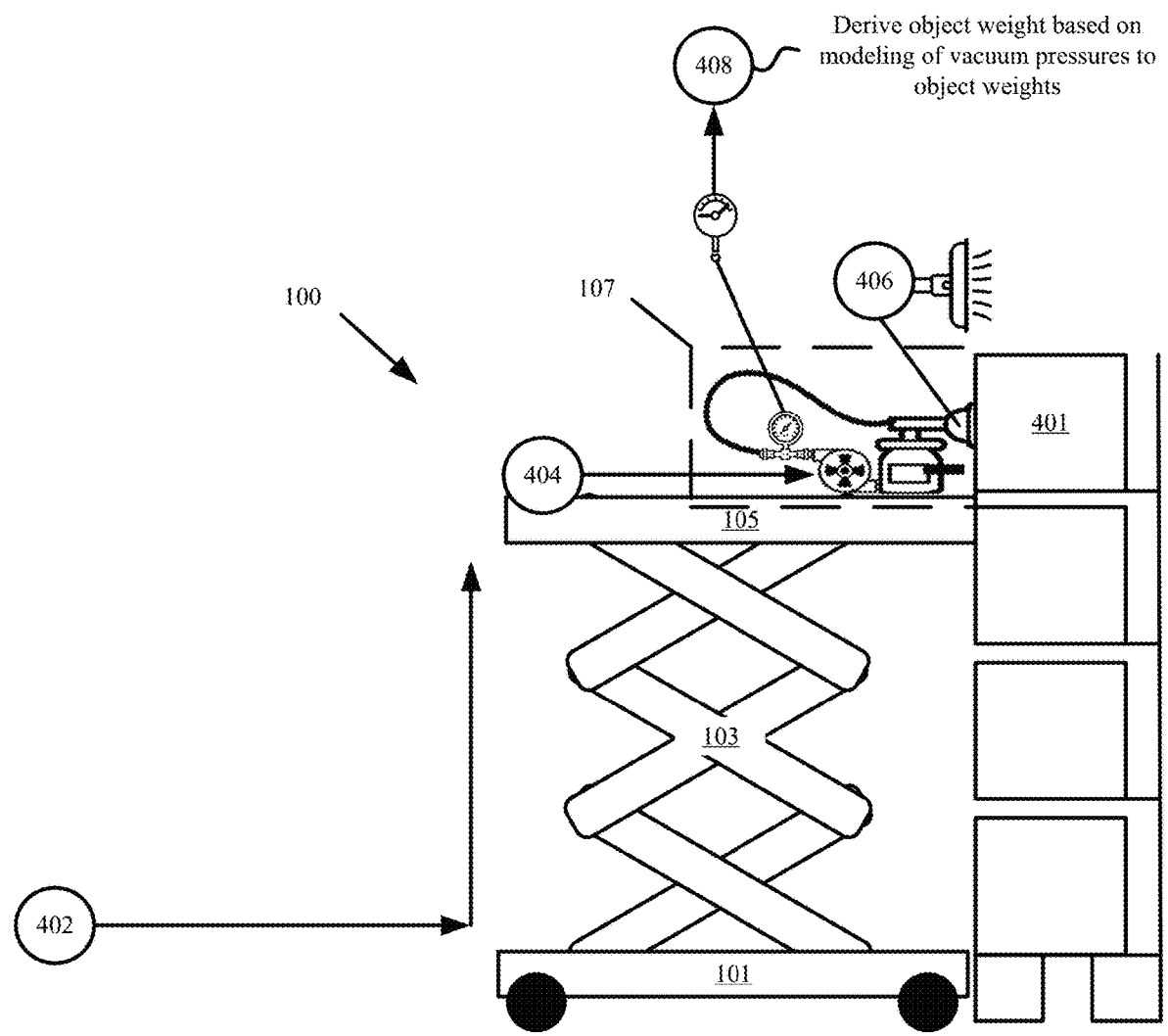
FIG. 4 illustrates an example of using vacuum pressure to measure the weight of an object in accordance with some embodiments presented herein.

FIG. 4 illustrates an example of using vacuum pressure to measure the weight of an object retrieved by robot 100 in accordance with some embodiments presented herein. As shown in FIG. 4, robot 100 may align (at 402) a position and height of platform 105 using motorized base 101 and lift 103 to equal or be slightly lower than a height of target object 401. Robot 100 may activate retrieval element 107 to contact (at 404) target object 401. Specifically, motor 301 may move suction assembly 303 across platform 105 until contact is made between suction assembly 303 and target object 401.

Robot 100 may activate (at 406) vacuum pump 305 to engage target object 401 using suction. Suction assembly 303, based on the surface area of the suction cup and the differential pressure created by vacuum pump 305, may be rated to generate enough force to engage and/or hold objects that are up a certain weight (e.g., 50 pounds).

Sensors 307 may track the vacuum pressure between suction assembly 303 and target object 401 upon activating (at 406) vacuum pump 305. The vacuum pressure may change depending on the weight of target object 401. For instance, activating (at 406) vacuum pump 305 to engage a sheet of paper may result in a higher vacuum pressure than when activating (at 406) vacuum pump 305 to engage a heavy box.

Based on modeled vacuum pressures to object weights and/or a formula that performs the conversion, robot 100 may derive (at 408) the weight of target object 401 based on the vacuum pressure created between suction assembly 303 and target object 401. In some embodiments, one or more AI/ML, techniques may be used to model the object weights associated with different vacuum pressures measured when retrieving different objects with robots 100.

Figure 5:
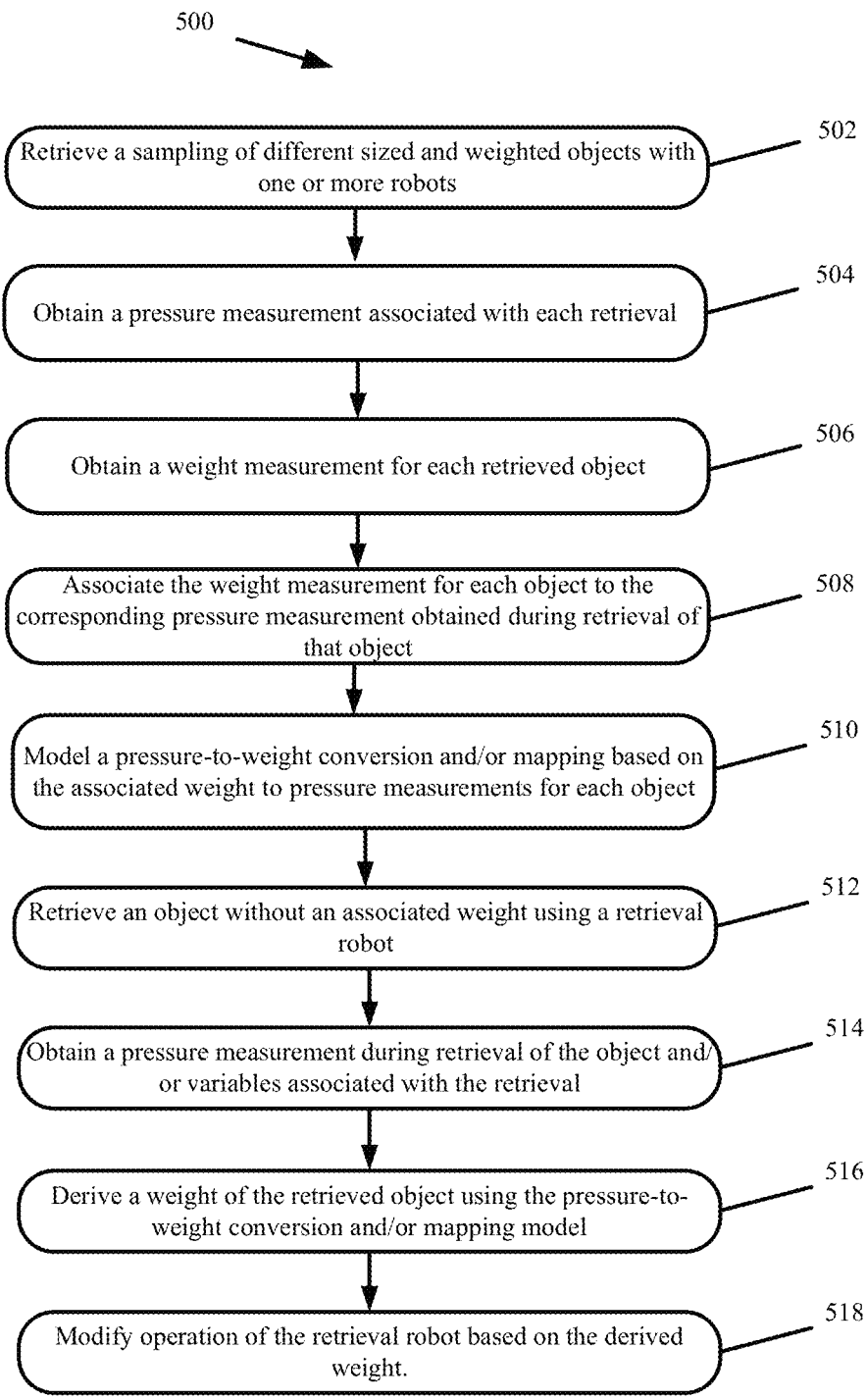
FIG. 5 presents a process for modeling a conversion between vacuum pressures associated with retrieving different objects and the weight of those objects in accordance with some embodiments presented herein.

FIG. 5 presents a process 500 for modeling a conversion between vacuum pressures associated with retrieving different objects and the weight of those objects in accordance with some embodiments presented herein. Process 500 may be implemented by one or more robots 100 operating in a site to retrieve different objects from the site and/or other devices or systems.

Process 500 may include retrieving (at 502) a sampling of different sized and weighted objects in the site with one or more robots 100. The sampled objects may include a fraction of the total objects housed in a site.

Process 500 may include obtaining (at 504) a pressure measurement associated with each retrieval using retrieval element 107 with suction assembly 303. In some embodiments, the pressure measurement may include a kilopascal measurement, Torr measurement, mbar measurement, or other measure of differential pressure that is output by sensors 307 after each object is engaged by suction assembly 303 using suction.

In some embodiments, the same sampled object may be retrieved by different robots 100 in order to account for pressure measurement differences or biases obtained from sensors 307 of the different robots 100. In some embodiments, the same sampled object may be retrieved from different locations that may have different friction coefficients and/or material properties that affect the retrieval of the object so that the variances in the pressure measurements resulting from retrievals from these different locations may be accounted for in the pressure-to-weight modeling. For instance, retrieval of a particular object from a first smooth surface may result in a different pressure measurement than retrieval of the particular object from a second rough surface as a greater force may be required to establish suction and move the particular object on the rough surface than on the smooth surface. In some embodiments, the retrievals (at 502) may also include objects of the same weight that have different packaging or surfaces that may also have different friction coefficients and/or otherwise affect the retrievals so that these variances are also accounted for in the pressure-to-weight modeling.

Process 500 may include obtaining (at 506) a weight measurement for each retrieved object. For instance, robots 100 may deliver the sampled objects to a scale where the object weight is measured. Alternatively, the sampled objects may include objects for which the weight is known and/or provided. For instance, a warehouse may store objects from different manufacturers, and some manufacturers may provide the weight measurement for their objects while other manufacturers may not provide a weight measurement for their objects. The object weights may be scanned or read from the object packaging or may be entered with object information in an inventory management system or other database.

Process 500 may include associating (at 508) the weight measurement for each object to the corresponding pressure measurement obtained during retrieval of that object. In some embodiments, a single weight measurement obtained (at 506) for a particular object may be linked to multiple pressure measurements when the particular object is retrieved using different robots 100, from different locations, and/or other conditions that affected the pressure measurement during engagement and/or retrieval of that particular object.

Process 500 may include modeling (at 510) a pressure-to-weight conversion and/or mapping based on the associated (at 508) weight to pressure measurements for each object. The modeling (at 510) may include using one or more neural networks, regression, pattern recognition, behavior modeling, and/or other AI/ML techniques to determine a mapping between the obtained pressure measurements and the object weight. Specifically, the modeling (at 510) may determine a formula, scale, conversion, and/or other mapping for the amount of vacuum pressure measured while retrieving objects of different weights and external structures from surfaces with different properties and/or other variables. The modeling (at 510) may account for any biasing or impact that different material properties or surfaces have on the pressure-to-weight conversion so that retrievals of the same object that produce different pressure measurements as a result of different storage locations with different surfaces or different container materials map to the same weight or similar weights that have less than a threshold amount of variance between them (e.g., less than 5% difference in the derived weight measurements In some embodiments, the modeling (at 510) may output a formula for converting the vacuum pressures and/or different variables associated with a retrieval from a particular storage location or container structure to a weight measurement. In some embodiments, the modeling (at 510) may output a model with a set of interconnected nodes for converting the vacuum pressures and different variables to different weights with different probability values. The generated models may include a non-linear relationship between the modeled actuator activations and/or measurements and object weight.

Process 500 may include retrieving (at 512) an object without an associated weight using a retrieval robot (e.g., robot 100), obtaining (at 514) a pressure measurement during retrieval of the object and/or variables associated with the retrieval. For instance, the retrieval robot may obtain a friction coefficient or material property for the object's storage location or the container type in which the object is housed or packaged. In some embodiments, the variables may be stored in a database and associated with the object or the storage location of the object. In some embodiments, the variables are nodes within the model such that an identifier for the object being retrieved and/or an identifier for the object's storage location may be input along with the pressure measurement into the model, and the model may account for any biasing based on the identifiers.

Process 500 may include deriving (at 516) a weight of the retrieved object using the pressure-to-weight conversion and/or mapping model. Specifically, the weight derivation may include biasing the pressure measurement based on the variables associated with the retrieval and the modeled impact of those variables on the pressure measurement. For instance, retrieving the object from a first storage location with a rough surface may include increasing or decreasing the pressure measurement by an amount modeled for the rough surface, whereas retrieving the object from a second storage location with a smooth surface may include using the pressure measurement without biasing or adjustment. The weight derivation may further include converting or mapping the biased pressure measurement from a first scale or first range of values associated with activations of suction assembly 303 or retrieval element 107 to a weight within a second scale or second range of values that are disassociated from output coming suction assembly 303, retrieval element 107, or their associated sensors.

Process 500 may include modifying (at 518) operation of the retrieval robot based on the derived weight. For instance, the retrieval robot may perform a first action or operation in response to the derived weight matching to an expected weight or a last tracked weight for the retrieved object by a threshold amount, and may perform a different second action or operation in response to the derived weight not matching to the expected weight or the last tracked weight by the threshold amount.

In some embodiments, robot 100 may rely on measurements from the strain gauge of retrieval element 107 to determine the force required to move the object onto the platform. Robot 100 may convert or map the strain gauge measurements to a weight measure based on generated models or formulas.

In some such embodiments, process 500 may be modified to model a conversion between the measurements produced by the strain gauge of retrieval element 107 and a weight measurement. For instance, process 500 may be modified to obtain strain gauge measurements, instead of or in addition to the pressure measurements, when retrieval element 107 retrieves the sampled set of objects, and using the strain gauge measurements with the associated weight measurements for the sample set of objects to generate one or more models for a strain or force-to-weight conversion and/or mapping that is based on surface properties, object structural properties, and/or other variables. The models may then be used by robots 100 to derive the weight of a particular object based on the force measured by the strain gauge when pulling or otherwise retrieving the particular object from a storage location onto platform 105.

Figure 6:
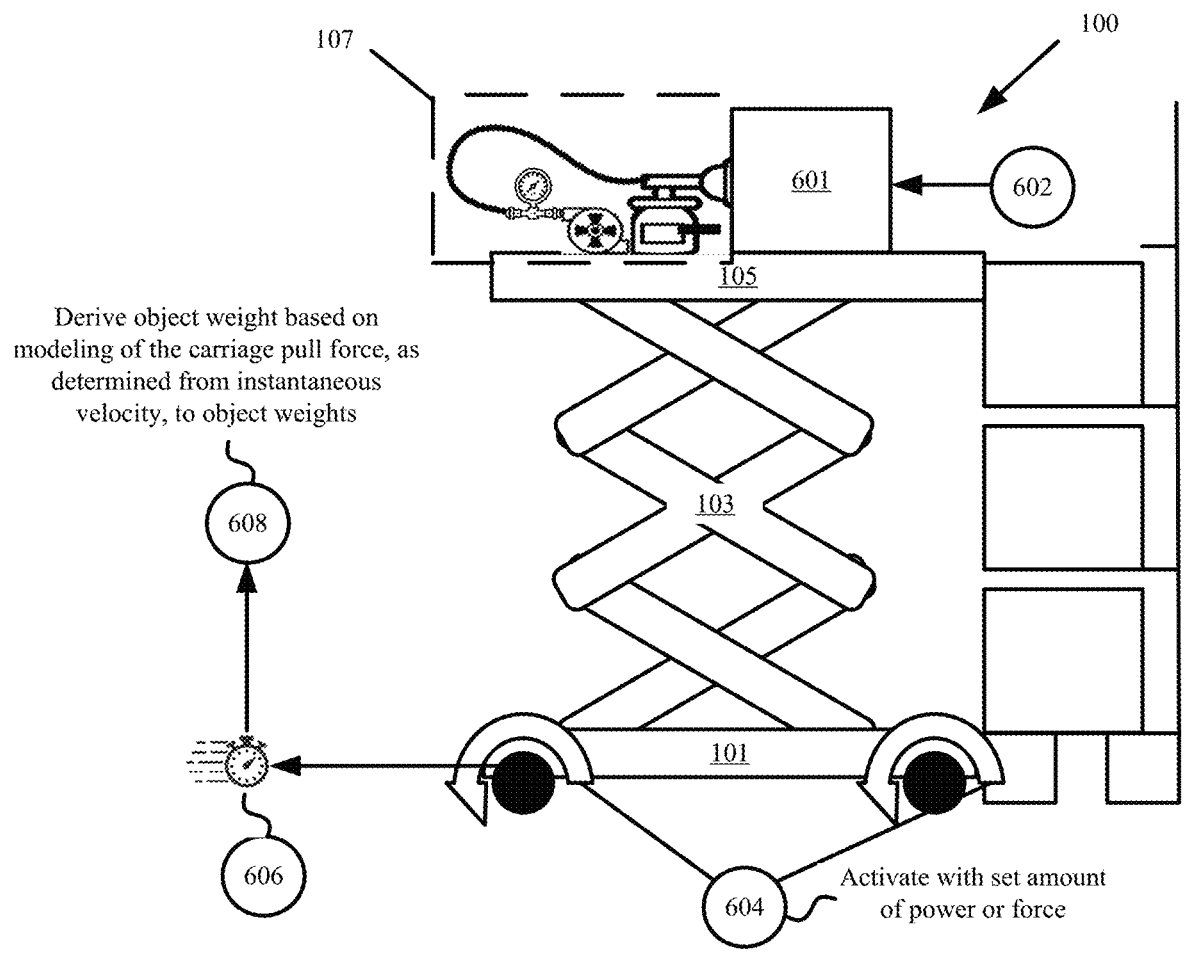
FIG. 6 illustrates an example of using the carriage pull force to measure the weight of an object in accordance with some embodiments presented herein.

In addition to or instead of deriving the object weight from pressure and/or strain gauge measurements, robots 100 may be configured to derive the object weight based on the carriage pull force required to move robots 100 while carrying an object. FIG. 6 illustrates an example of using the carriage pull force to measure the weight of an object retrieved by robot 100 in accordance with some embodiments presented herein.

As shown in FIG. 6, robot 100 may place (at 602) target object 601 on platform 105 using retrieval element 107. Robot 100 may activate (at 604) the motorized base 101 with a set amount of power or force, and may use wheel encoders and/or other sensors 207 within base 101 to measure its instantaneous velocity. The instantaneous velocity may measure the speed and/or distance moved by robot 100 when carrying the object using the specified pull force over a given duration. The instantaneous velocity may be converted or mapped (at 608) to a weight measurement using one or more models for the speed or distance moved by robot 100 when carrying no additional weight and when carrying objects of different weights.

A heavier object will reduce the instantaneous velocity of robot 100 more than a lighter object causing robot 100. In other words, robot 100 may accelerate less quickly and reach a different velocity over a period of time than if robot 100 was carrying the lighter object or no object.

To model the carriage pull force-to-weigh conversion and/or mapping, process 500 may be modified to obtain instantaneous velocity measurements of different robots after retrieving the sampled set of objects and activating the motorized base 101 drive motors with a particular amount of power or force, and using the instantaneous velocity measurements with the associated weight measurements for the sample set of objects to generate one or more models for an instantaneous velocity-to-weight conversion and/or mapping. The models may then be used by robots 100 to derive the weight of a particular object based on the instantaneous velocity achieved by each robot 100 when carrying the particular object and activating the drive motors to the set of power or force.

In some embodiments, robot 100 may use a measure of torque to determine the object weight. In some such embodiments, robot 100 may set the drive motors within motorized base 101 to operate with a particular torque. Wheel encoders or other sensors may measure the distance that robot 100 moves over an interval of time or acceleration of robot 100 when carrying the target object with motorized base 101 producing the particular torque. Robot 100 may convert or map the distance or acceleration measurement to a weight measurement based on a model for the impact that weight has on the distance robot 100 moves and/or the acceleration of robot 100 with motorized base 101 producing the particular torque.

Figure 7:
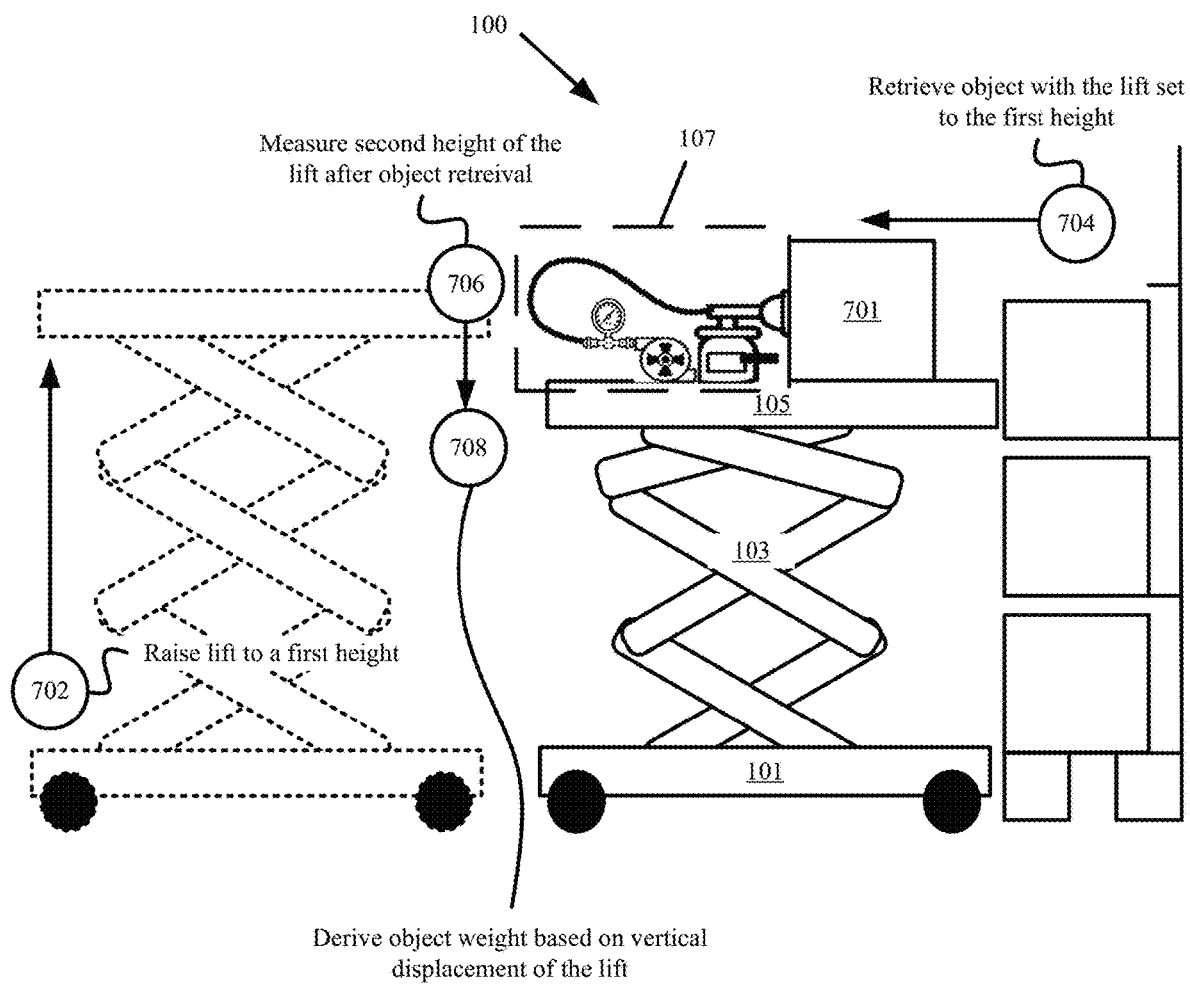
FIG. 7 illustrates an example of using the lift displacement to measure the weight of an object in accordance with some embodiments presented herein.

In addition to or instead of deriving the object weight using the aforementioned actuators and/or associated measurements, robots 100 may be configured to derive the object weight based on the lift displacement that occurs upon retrieving an object onto platform 105. FIG. 7 illustrates an example of using the lift displacement to measure the weight of an object retrieved by robot 100 in accordance with some embodiments presented herein.

Robot 100 may raise (at 702) lift 103 to a first height. Specifically, robot 100 may use a draw wire gauge or another distance sensor to measure the first height at which platform 105 becomes aligned slightly below the height of target object 701, or the first height at which target object 701 may be retrieved onto platform 105 using retrieval element 107.

In some embodiments, robot 100 may set lift 103 to retain the first height by applying a constant lift force once lift 103 arrives at the first height. For instance, robot 100 may set the pistons controlling lift 103 to maintain a specific pneumatic force that is needed to elevate lift 103 to the first height.

Robot 100 may use retrieval element 107 to retrieve (at 704) target object 701 from a storage location onto platform 105 while platform 105 is at the first height. Robot 100 may use the draw wire gauge or another distance sensor to measure (at 706) a second height of lift 103 after target object 701 is retrieved onto lift 103.

Robot 100 may calculate the difference between the first height and the second height to determine the amount of vertical displacement caused by placing target object 701 atop the lift 103. The vertical displacement may be converted (at 708) to a weight measurement based on modeling of different vertical displacements caused by different weights and/or a formula that tracks the vertical displacements caused by the different weights.

Figure 8:
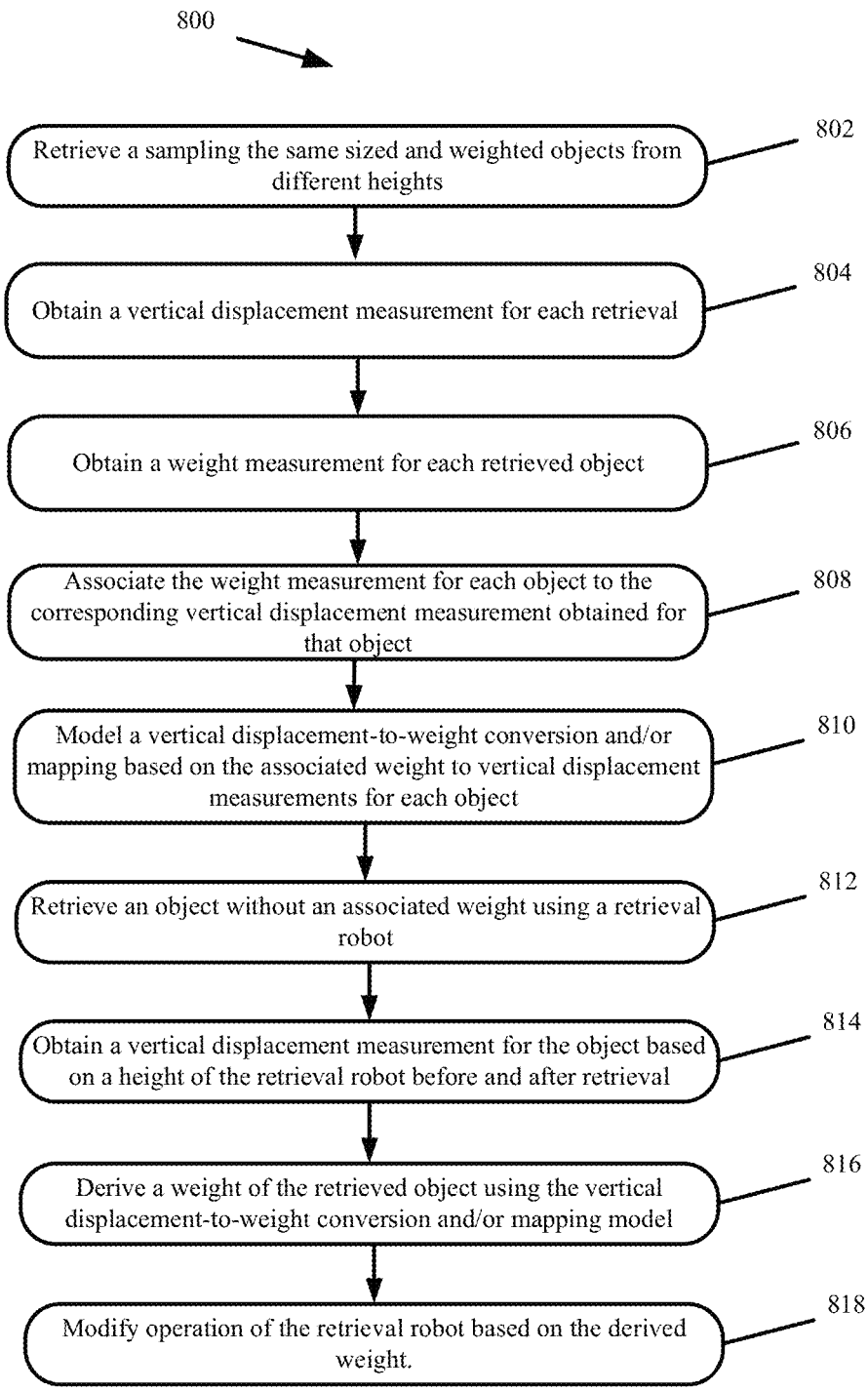
FIG. 8 presents a process for modeling a conversion between lift vertical displacement and the weight of the objects causing the lift vertical displacement in accordance with some embodiments presented herein.

FIG. 8 presents a process 800 for modeling a conversion between lift vertical displacement and the weight of the objects causing the lift vertical displacement in accordance with some embodiments presented herein. Process 800 may be implemented by one or more robots 100.

The same object or the same weight may cause different vertical displacements of lift 103 when lift 103 is at different heights. Accordingly, to ensure a proper modeling of the vertical displacement caused by different objects or weights, process 800 may include retrieving (at 802) a sampling of the same sized and weighted objects in the site with one or more robots 100 from different heights.

Process 800 may include obtaining (at 804) a vertical displacement measurement for each retrieval. In some embodiments, the vertical displacement measurement may include a first height measurement for the lift height prior to object retrieval, and a second height measurement for the lift height after object retrieval. Each height may be measured using the draw wire gauge that may be connected on one end to motorized base 101 and to platform 105 on an opposite end, or another distance sensor that be attached to at least one of motorized base 101 or platform 105.

Process 800 may include obtaining (at 806) a weight measurement for each retrieved object. Process 800 may include associating (at 808) the weight measurement for each object to the vertical displacement measurement (e.g., the first height measurement and the second height measurement) obtained before and after each retrieval of that object.

Process 800 may include modeling (at 810) a vertical displacement-to-weight conversion and/or mapping based on the associated (at 808) weight to vertical displacement measurements for each object. The modeling (at 810) may include using one or more neural networks, regression, pattern recognition, behavior modeling, and/or other AI/ML techniques to determine different amounts by which lift 103 is vertically displaced when the same weights are applied atop lift 103 with lift !!03 at different starting heights. For instance, placing a particular weight on lift 103 when lift 103 is at a first height may cause a first amount of vertical displacement, and placing the particular weight on lift 103 when lift 103 is at a different second height may cause a different second amount of vertical displacement. Accordingly, the AI/ML techniques may determine different weight-to-displacement ratios for lift 103 at different starting heights, and in so doing, may bias the resulting models to have a non-uniform amount of displacement for the same weight based on the first height measurement of lift 103 prior to the resulting displacement.

Process 800 may include retrieving (at 812) an object without an associated weight using a retrieval robot (e.g., robot 100), obtaining (at 814) a vertical displacement measurement (e.g., a first height measurement prior the object retrieval onto platform 105 and a second height measurement after the object retrieval onto platform 105). Process 800 may include deriving (at 816) a weight of the retrieved object using the vertical displacement-to-weight conversion and/or mapping model. Deriving (at 816) the object weight may include converting or mapping the height measurements from a first scale or first range of values associated with activations of lift 103 and/or sensors associated with lift 103 to a weight within a second scale or second range of values that are disassociated from output coming from lift 103 or its associated sensors. Process 800 may include modifying (at 818) operation of the retrieval robot based on the derived weight.

In some embodiments, robot 100 may forego the height measurements, and may determine the weight of the retrieved object based on the difference in lift force needed to realign the height of platform 105 to the first height. For instance, robot 100 may use one or more cameras to determine when platform 105 becomes aligned with a shelf or other structure holding the target object. Robot 100 may receive output from one or more sensors associated with lift 103 that measure the pneumatic force, power, or other configurable parameters of the lift motors needed to align platform 105 with the shelf.

Once the target object is retrieved onto platform 105 and lift 103 is vertically displaced as a result of the added weight atop lift 103, robot 100 may determine an increase to the pneumatic force, power, or other configurable parameters of the lift motors needed to realign platform 105 with the shelf. Robot 100 may then compute the weight of the object based on the determined increase.

Figure 9:
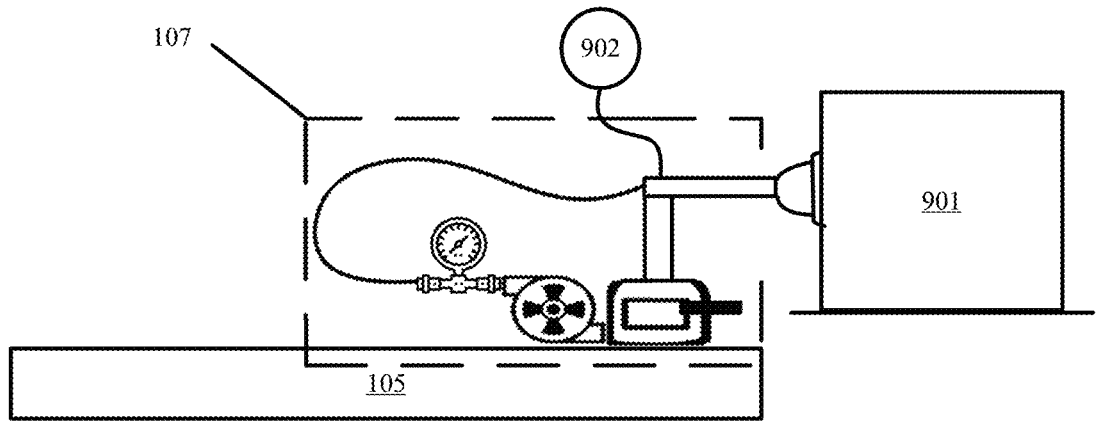
FIG. 9 illustrates an example of using the vertical displacement of the retrieval element to measure the weight of an object in accordance with some embodiments presented herein.
Figure 9:
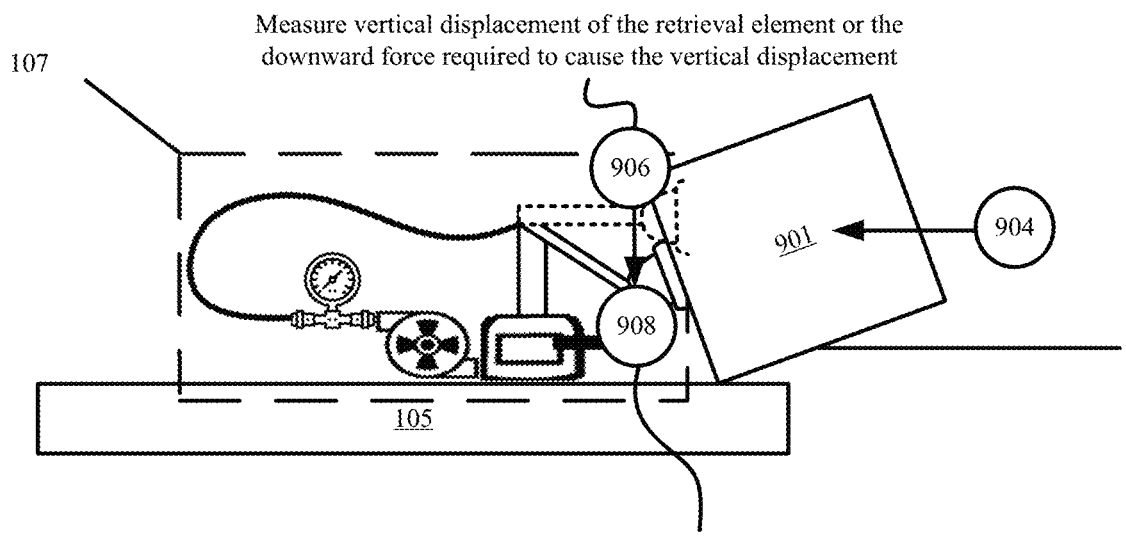

In some embodiments, the vertical displacement of retrieval element 107 may be used to derive the weight of the retrieved object based on a vertical displacement-to-weight modeling for retrieval element 107. FIG. 9 illustrates an example of using the vertical displacement of retrieval element 107 to measure the weight of an object retrieved by robot 100 in accordance with some embodiments presented herein.

FIG. 9 illustrates retrieval element 107 in an upright first position (at 902) that is perpendicular to platform 105 prior to retrieval element 107 retrieving object 901 onto platform 105. As shown in FIG. 9, platform 105 may be positioned slightly below the height of the shelf or other structure where object 901 is initially located, and retrieval element 107 may be moved forward until contact is made with target object 901.

Retrieval element 107 may retract in order to pull (at 904) target object 901 off the shelf and onto platform 105. Since the height of platform 105 is lower than the shelf retaining target object 901, the weight of target object 901 may pull (at 906) the spring loaded retrieval element 107 down. One or more sensors about retrieval element 107 may measure the downward force that is applied on retrieval element 107 or the vertical displacement of retrieval element 107 while engaging object 901 that is now wholly or partially on platform 105. Robot 100 may convert or map (at 908) the vertical displacement and/or downward force measurement to a weight measurement using one or more models or formulas that are derived for the vertical displacement of retrieval element 107.

In some embodiments, the weight measurement obtained using one of the pressure, carriage pull force, lift compression, and/or other techniques may be used to verify or confirm the weight measurement obtained from another one of the techniques. In other words, robot 100 may measure the object weight using two more different techniques in order to corroborate each weight measurement or to generate a consolidated weight measurement from the weight measurements of different techniques.

The weight measurements may also be used for inventory management. For instance, if the derived object weight does not match to an expected weight or a last derived object weight, then robot 100 may determine that it has retrieved an incorrect object or that an incorrect object was placed in the location of the desired object. Robot 100 may take remedial action in response to the detected anomaly.

Similarly, the total derived weight for the object may be divided by the per unit weight of the items inside the object in order to determine the quantity of items inside the container. If the derived quantity for the object does not match to a stored quantity, robot 100 may dynamically modify its operation by transferring the object to a remediation station rather than a destination location originally specified as part of the retrieval operation being performed by robot 100.

Figure 10:
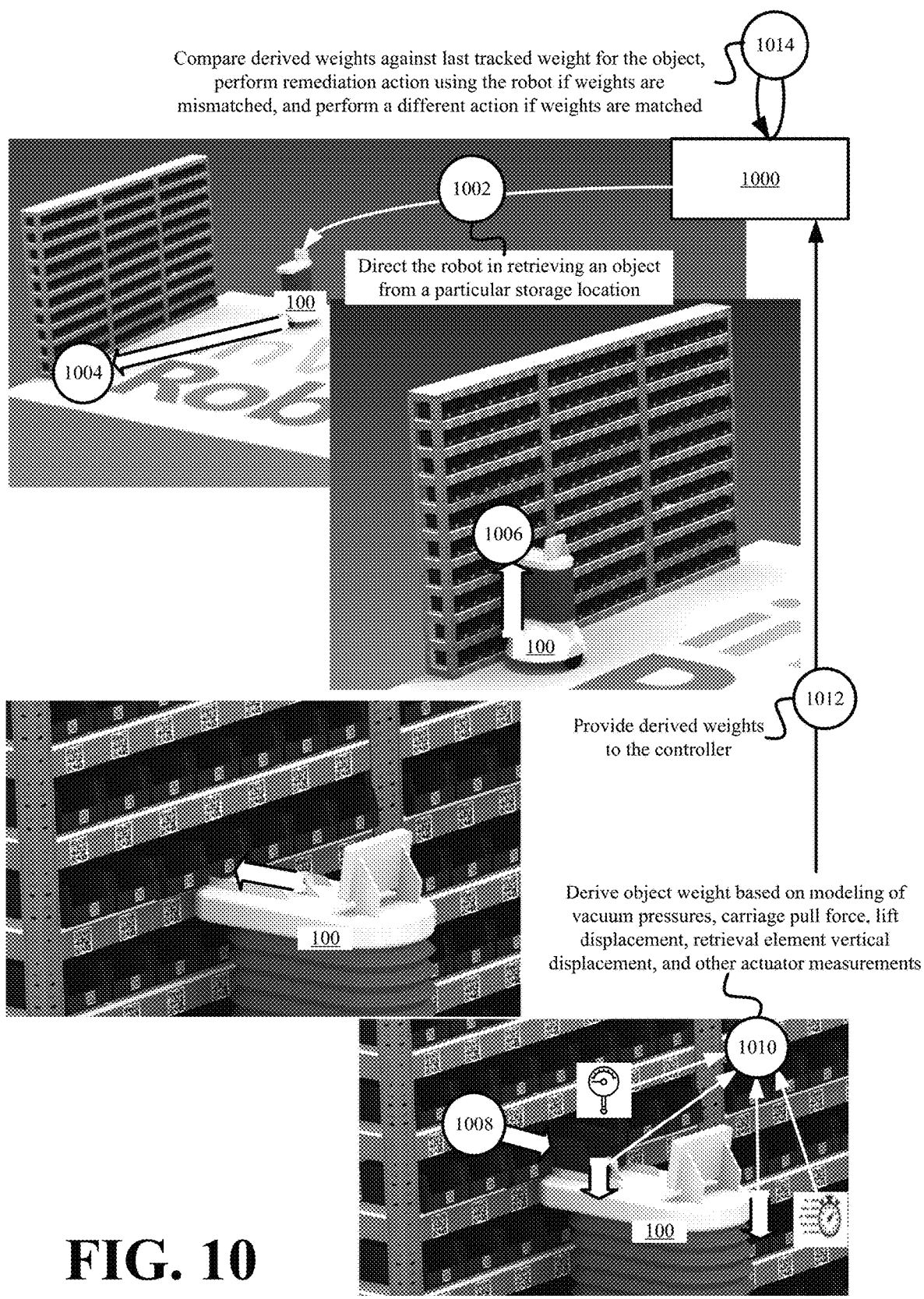
FIG. 10 illustrates an example of performing inventory management based on object weights and/or quantities derived from pressure, carriage pull force (e.g., strain gauge measurements), lift displacement, and/or retrieval element displacement measurements in accordance with some embodiments presented herein.

FIG. 10 illustrates an example of performing inventory management based on object weights and/or quantities derived from pressure, carriage pull force (e.g., strain gauge measurements), lift displacement, and/or retrieval element displacement measurements in accordance with some embodiments presented herein. FIG. 10 illustrates controller 1000 directing (at 1002) robot 100 in retrieving a particular object from a particular storage location. Controller 1000 may be part of an inventory management system and/or a robot management system, and may coordinate order fulfillment within a site by controlling the operations of various robots 100 and/or other actors in the site via wireless messaging exchanged with robots 100 and/or the other actors. In some embodiments, controller 1000 may provide robot 100 with one or more identifiers for identifying the particular storage location and/or the particular object at the particular storage location.

Robot 100 may move (at 1004) to the particular storage location using motorized base 101 and various sensors used by robot 100 for autonomous navigation within the site. Robot 100 may align (at 1006) platform 105 next to the particular storage location via activation of lift 103, and may retrieve (at 1008) the particular object at the particular storage location using retrieval element 107. Robot 100 may compute (at 1010) the particular object's weight based on one or more vacuum pressure, carriage pull force, lift displacement, retrieval element vertical displacement, and/or other actuator or associated sensor measurements.

The computed weight may be used to verify that the correct object was stored at and retrieved from the particular storage location. In particular, the computed weight of the retrieved object may be compared to the last measured weight of the particular object that is expected to be stored at the particular storage location. In some embodiments, robot 100 may provide (at 1012) the computed weight to controller 1000 for the comparison and/or verification. In some other embodiments, robot 100 may receive the expected weight from controller 1000, and may verify retrieval of the correct object locally.

In response to determining (at 1014) that the computed weight of the retrieved object does not match to the last measured weight for the particular object expected to be at the particular storage location, controller 1000 may control robot 100 in performing a remediation action. In some embodiments, the computed weight may differ from the last measured weight by a threshold amount without triggering the remediation action. The remediation action may include transferring the retrieved object to a remediation station where it may be inspected to determine why the weight is mismatched. For instance, the wrong object may have inadvertently been placed in the particular storage location, or robot 100 may have incorrectly identified the particular storage location.

In response to determining (at 1014) that the computed weight of the retrieved object matches by the threshold amount to the last measured weight for the particular object, controller 1000 may control robot 100 in delivering the retrieved object to an order fulfillment destination. One or more items may be removed from the retrieved object at the order fulfillment destination, and used to fulfill one or more orders involving those and/or other items.

Controller 1000 may also perform an inventory count based on the computed weight of the retrieved object. For instance, controller 1000 may store or may be configured with the weight of individual items within the particular object, and may track the last measured quantity for items in the particular object. Accordingly, controller 1000 may divide the total computed weight with the per unit weight to derive a count for the number of items within the particular object. If the derived count is below a threshold value, controller 1000 may automatically replenish inventory by issuing an order for more of the items within the retrieved object.

Figure 11:
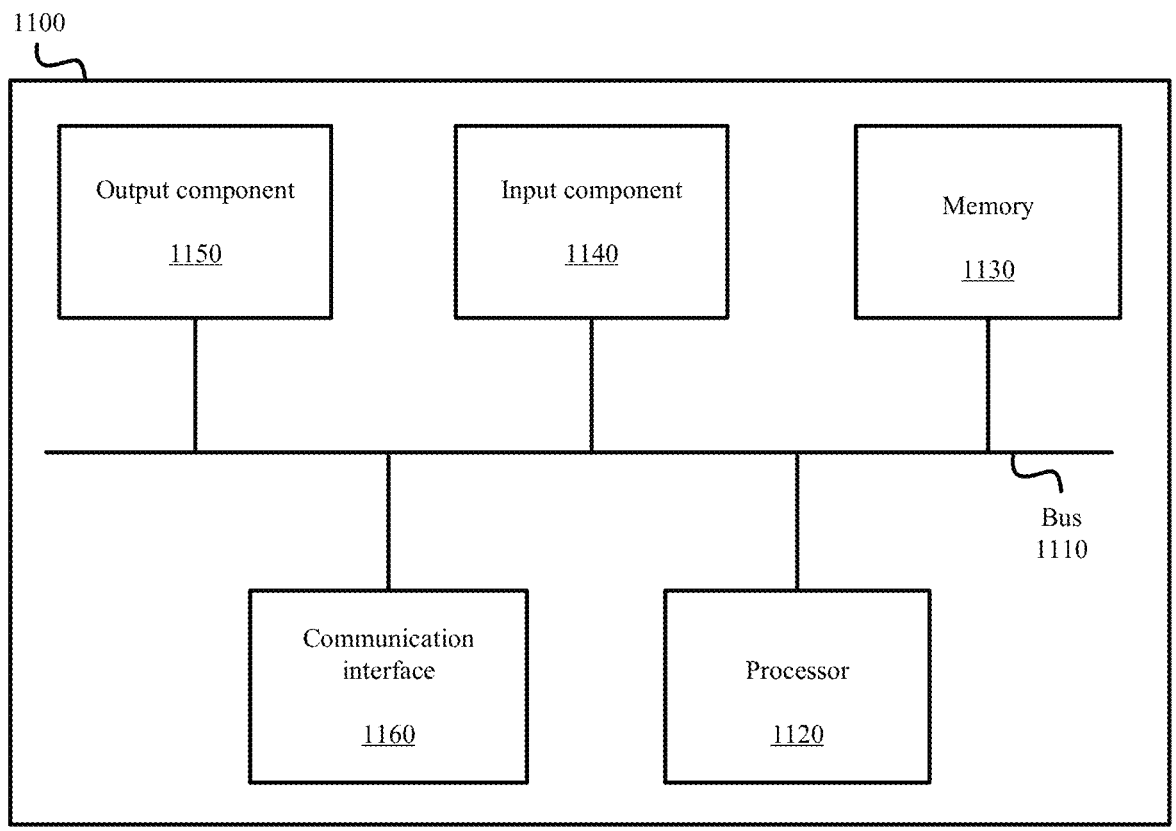
FIG. 11 illustrates example components of one or more devices, according to one or more embodiments described herein.

FIG. 11 is a diagram of example components of device 1100. Device 1100 may be used to implement one or more of the devices or systems described above (e.g., controller 1000, parts of robot 100, etc.). Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   activating one or more actuators of a robot during retrieval of an object;
   obtaining a measurement in response to activating a particular actuator of the one or more actuators; and
   deriving a weight of the object based on the measurement, wherein deriving the weight comprises converting the measurement from a first range of values that are associated with activations of the particular actuator to a second range of values that are disassociated with activations of the particular actuator.

2. The method of claim 1 further comprising:
   modifying an operation of the robot in response to the weight that is derived for the object.

3. The method of claim 2, wherein modifying the operation comprises:
   transferring the object to a first destination with the robot in response to the weight matching an expected or last tracked weight for the object; and
   transferring the object to a second destination with the robot in response to the weight not matching the expected or last tracked weight for the object.

4. The method of claim 1 further comprising:
   modeling different measurements produced by the particular actuator during retrieval of different objects with known weights; and
   wherein deriving the weight comprises determining the weight of the object based on the modeling comprising one or more relationships between activations of the particular actuator and different weights.

5. The method of claim 4, wherein modeling the different measurements comprises:
   retrieving the different objects from different locations using one or more robots;
   obtaining a measurement from the particular actuator or a sensor associated with the particular actuator for each retrieval of the different objects;
   obtaining a measured weight for each object of the different objects;
   determining the one or more relationships between the activations of the particular actuator and the different weights by evaluating measured weights of the different objects relative to the different measurements obtained from each retrieval of the different objects; and
   generating a model based on relationships between the measured weights of the different objects and the different measurements obtained from each retrieval of the different objects.

6. The method of claim 4, wherein modeling the different measurements comprises:
   biasing one or more of the different measurements based on a location from which an object is retrieved or a material structure of an object that is retrieved, wherein biasing a measurement comprises adjusting the measurement.

7. The method of claim 1,
   wherein obtaining the measurement comprises measuring a vacuum pressure with which the particular actuator engages the object; and
   wherein deriving the weight further comprises converting the vacuum pressure to a derived weight of the object.

8. The method of claim 1,
   wherein obtaining the measurement comprises measuring a carriage pull force by which the robot moves with the object over a specified time; and
   wherein deriving the weight further comprises converting the carriage pull force to a derived weight of the object.

9. The method of claim 1,
   wherein obtaining the measurement comprises measuring an amount by which a lift of the robot is displaced after retrieving the object atop the lift; and
   wherein deriving the weight further comprises converting the amount by which the lift is displaced to a derived weight of the object.

10. The method of claim 1,
    wherein obtaining the measurement comprises measuring an amount by which a retrieval element of the robot is displaced after retrieving the object from a storage location onto a platform of the robot; and
    wherein deriving the weight further comprises converting the amount by which the retrieval element is displaced to a derived weight of the object.

11. The method of claim 1, wherein activating the one or more actuators comprises one or more of:
    activating a vacuum pump of the robot to engage the object with a particular amount of vacuum pressure;
    activating drive motors of the robot to move with an instantaneous velocity after retrieving the object; and
    activating a lift of the robot to align a height of the lift with a height of the object prior to retrieval.

12. The method of claim 1, wherein obtaining the measurement comprises:
    determining a pull force applied by the robot to retrieve the object based on output from a strain gauge of the robot.

13. The method of claim 1, wherein obtaining the measurement comprises:
    determining a vertical displacement of a lift after retrieval of the object based on output from a distance sensor that measures at least distance between a top and a bottom of the lift.

14. The method of claim 1 further comprising:
    generating an actuator activation-to-weight model from evaluating relationships between sampled objects with known weights and different measurements produced by the particular actuator during retrieval of the sampled objects.

15. The method of claim 14, wherein deriving the weight further comprises:
    determining a conversion between the measurement and the weight using the actuator activation-to-weight model.

16. The method of claim 14 further comprising:
    determining an impact that one or more environmental variables having on the different measurements produced by the particular actuator during the retrieval of the sampled objects; and biasing the actuator activation-to-weight model based on the impact determined for the one or more environmental variables.

17. The method of claim 16, wherein deriving the weight further comprises:
identifying a particular environmental variable during retrieval of the object by the robot; and
modifying the measurement based on the biasing of the actuator activation-to-weight model for the particular environmental variable.

18. A system comprising:
a robot comprising one or more actuators; and
one or more processors configured to:
  activate the one or more actuators during retrieval of an object;
  obtain a measurement in response to activating a particular actuator of the one or more actuators; and
  derive a weight of the object based on the measurement, wherein deriving the weight comprises converting the measurement from a first range of values that are associated with activations of the particular actuator to a second range of values that are disassociated with activations of the particular actuator.

19. The system of claim 18, wherein the one or more processors are further configured to:
modify an operation of the robot in response to the weight that is derived for the object.

20. A non-transitory computer-readable medium, storing a plurality of processor-executable instructions to:
activate one or more actuators of a robot during retrieval of an object;
obtain a measurement in response to activating a particular actuator of the one or more actuators; and
derive a weight of the object based on the measurement, wherein deriving the weight comprises converting the measurement from a first range of values that are associated with activations of the particular actuator to a second range of values that are disassociated with activations of the particular actuator.

\* \* \* \* \*